United States Patent
Burnett et al.

(10) Patent No.: US 7,506,569 B1
(45) Date of Patent: Mar. 24, 2009

(54) STORE EJECTION SYSTEM UTILIZING A MIXED FUEL AND OXIDIZER IN A POWER SOURCE

(75) Inventors: Laura Marie Burnett, Brownsburg, IN (US); Robert Alan Bailey, Avon, IN (US); Robert James Killian, Martinsville, IN (US)

(73) Assignee: Raytheon Company, Waltham, MA (US)

( * ) Notice: Subject to any disclaimer, the term of this patent is extended or adjusted under 35 U.S.C. 154(b) by 889 days.

(21) Appl. No.: 10/846,044

(22) Filed: May 14, 2004

(51) Int. Cl.
*B64D 1/04* (2006.01)
*F02C 3/20* (2006.01)

(52) U.S. Cl. .................. 89/1.51; 60/280; 60/39.461; 294/82.26

(58) Field of Classification Search .......... 89/1.51, 89/1.54, 1.57; 244/137.4; 60/257, 258, 260, 60/280, 281, 326, 484, 486, 633–638, 686, 60/39.461–39.47; 294/82.26
See application file for complete search history.

(56) References Cited

U.S. PATENT DOCUMENTS

| | | | | |
|---|---|---|---|---|
| 2,743,577 A * | 5/1956 | Malick | ................ | 60/39.091 |
| 2,749,063 A * | 6/1956 | Low | .................. | 244/137.4 |
| 2,856,224 A * | 10/1958 | Kelly et al. | ............ | 294/82.26 |
| 2,869,523 A * | 1/1959 | Murphy | ................ | 60/638 |
| 2,883,910 A * | 4/1959 | Nessler | ................ | 89/1.57 |
| 2,890,843 A * | 6/1959 | Attinello | .............. | 244/208 |
| 2,918,324 A * | 12/1959 | Murphy | ................ | 294/82.26 |
| 2,931,341 A * | 4/1960 | Meadows et al. | ........ | 91/169 |
| 2,937,899 A * | 5/1960 | Murphy | ................ | 294/82.26 |
| 2,948,563 A * | 8/1960 | Landry | ................ | 294/82.21 |
| 2,977,149 A * | 3/1961 | Burton | ................ | 294/82.26 |
| 3,016,258 A * | 1/1962 | Landry | ................ | 294/82.26 |
| 3,037,805 A * | 6/1962 | Geffner et al. | ........ | 294/82.26 |
| 3,178,884 A * | 4/1965 | Boardman, Jr. | ......... | 60/247 |
| 3,500,716 A * | 3/1970 | Schnepfe et al. | ........ | 89/1.57 |
| 4,246,472 A * | 1/1981 | Sun et al. | .............. | 235/401 |
| 4,257,639 A | 3/1981 | Stock | | |
| 4,399,968 A | 8/1983 | Stock et al. | | |
| 4,520,975 A * | 6/1985 | Blackhurst | ............ | 244/137.4 |
| 4,572,053 A | 2/1986 | Sosnowski et al. | | |
| 4,635,443 A * | 1/1987 | Pino | .................. | 60/628 |
| 4,850,553 A * | 7/1989 | Takata et al. | .......... | 244/137.4 |
| 4,964,595 A * | 10/1990 | Nordhaus | ............ | 244/137.4 |
| 5,029,776 A * | 7/1991 | Jakubowski et al. | ..... | 244/137.4 |
| 5,583,312 A | 12/1996 | Jakubowski, Jr. | | |
| 5,765,361 A * | 6/1998 | Jones et al. | ............ | 60/204 |
| 5,857,647 A | 1/1999 | Jakubowski, Jr. | | |
| 6,427,599 B1 * | 8/2002 | Posson et al. | .......... | 102/336 |
| 6,676,083 B1 * | 1/2004 | Foster et al. | .......... | 244/137.4 |
| 7,083,148 B2 * | 8/2006 | Bajuyo et al. | .......... | 244/137.4 |

* cited by examiner

*Primary Examiner*—Bret Hayes
(74) *Attorney, Agent, or Firm*—Daly, Crowley, Mofford & Durkee, LLP

(57) ABSTRACT

A store ejection system for an aircraft includes a store ejector, and a power source for the store ejector. The power source has a fuel supply of a flowable combustible fuel, an oxidizer supply of a flowable oxidizer, a combustion chamber that controllably receives the combustible fuel from the fuel supply and the oxidizer from the oxidizer supply and forms a combustible mixture thereof, an igniter that controllably ignites the combustible mixture in the combustion chamber, and a combustion-gas line extending from the power source to the store ejector.

16 Claims, 2 Drawing Sheets

STORE EJECTION SYSTEM UTILIZING A MIXED FUEL AND OXIDIZER IN A POWER SOURCE

This invention relates to store ejection systems for deployable stores, such as bombs, fuel tanks, and reconnaissance pods, on an aircraft.

BACKGROUND OF THE INVENTION

An external deployable store, such as a bomb, is usually supported below an aircraft with an ejection system. The ejection system includes a pair of suspension hooks that engage the lugs on the top side of the store. When the store is to be released, the suspension hooks are operated to disengage the lugs so that the store may fall away from the aircraft. The suspension hooks are usually released by the firing of a pyrotechnic device activated by an electrical current. The resulting gases formed by the explosion of the pyrotechnic device create enough force to rotate the hooks free of the lugs and release the store.

The use of only a hook-and-lug arrangement was workable for some of the early types of slowly flying aircraft. The force of gravity was sufficient to allow the store to fall away from the aircraft smoothly after release. For more modern, faster aircraft, the air flow on the underside of the aircraft may interfere with the smooth, controllable dropping of the store away from the aircraft after it is released.

To ensure that the store is reliably separated from the aircraft, ejectors are provided to push the store away from the aircraft after the hooks are released from the lugs. The ejector must be powered by a power source that provides a controllable, rapidly applied force against the top side of the store in the correct sequence relative to the release of the lugs from the suspension hooks.

There are several other considerations for the store-ejection power source. The power source must be as light in weight and as compact as possible to avoid interference with the aircraft's aerodynamics. The power source should desirably be usable for multiple ejections of different stores, and should recycle rapidly after one ejection to be ready for the next ejection. The power source must consistently provide enough force to release the store without having to reload between firings. The ejection system should automatically regenerate and prime itself for the next application, thus eliminating the need for manual installation of a fresh power source. This feature is particularly desirable in the event of a hung store that requires several attempts to accomplish the release and ejection.

A number of different types of power sources for the ejectors have been used over the years. The most widely used method is the pyrotechnic device. This pyrotechnic device is ignited to generate a gas that expands and applies a force not only to rotate the hooks away from the lugs, but also to activate a piston that pushes the store away from the aircraft. This entire process occurs within a matter of seconds and is precision tuned to ensure that the hooks open before the piston is activated in an attempt to avoid catastrophic failure. While this method has proven effective, there are several disadvantages. One drawback is that each power source allows for only one release or ejection. The power source must then be reloaded manually before the next ejection. This inability to utilize the power source for multiple ejections not only creases added cost and down time, but it is also a safety hazard. Occasionally, stores become caught or "hung" on the hooks after the power source has been used. The pilot must then initiate a series of maneuvers designed to release the load. This becomes a risk because of the lack of control over when or where the store is released. In addition, the combustion product of the pyrotechnic device does not burn cleanly, resulting in an extremely corrosive, sticky by-product. In order to minimize the damage done by the corrosion and to lessen the risk of malfunction due to the sticky by-product, the ejection devices must be cleaned at the end of every firing day. While these pyrotechnic devices are generally reliable, there is still the risk of unintentional detonations. There have been occasions when a static electrical discharge from clothing was sufficient to set off the device before it could be loaded into the ejector, resulting in an injury.

A number of other power sources for ejection mechanisms have been proposed, but most are relatively complex or require too much space to be utilized effectively. These other power sources are also too heavy for many applications, and also may affect the aerodynamics of the aircraft.

There is a need for an improved store ejection system that is operable with fast recycling of the ejection process, is safe, is light in weight, is compact, and does not produce corrosive reaction products. The present invention fulfills this need, and further provides related advantages.

SUMMARY OF THE INVENTION

The present approach provides a store ejection system including a power source that produces the required ejection force controllably and rapidly. The power source is light in weight and compact, and does not adversely affect the aerodynamics of the aircraft. It is safe to use. The combustion product gas is desirably a mixture of carbon dioxide and water, which is non-corrosive and does not damage either the power source or the ejector. The power source has a short recycle time that permits stores to be ejected in rapid sequence and allows the store ejector to be used to free hung stores. It may be used to power one or multiple ejectors, for one or multiple stores. The number of ejections is limited only by the amounts of fuel and oxidizer available, which may be selected according to the number of stores to be deployed.

In accordance with the invention, a store ejection system comprises a store ejector, and a power source for the store ejector. The power source comprises a fuel supply of a flowable combustible fuel, an oxidizer supply of a flowable oxidizer, a combustion chamber that controllably receives the combustible fuel from the fuel supply and the oxidizer from the oxidizer supply and forms a combustible mixture thereof, an igniter that controllably ignites the combustible mixture in the combustion chamber, and a combustion-gas line extending from the power source to the store ejector. Preferably, the combustion product of the combustion of the fuel and the oxidizer is carbon dioxide and water vapor. There may be, and typically is, a second store ejector, and the power source powers the second store ejector. The combustion-gas line therefore extends from the power source to the second store ejector as well.

The combustible fuel is preferably stored as a liquid. The preferred combustible fuels are hydrocarbons, with examples being kerosene and aviation fuels such as JP-4 and JP-5. The oxidizer is preferably air or oxygen. The oxidizer may be stored, as in the case of oxygen, or drawn from the surrounding air, with the stored oxidizer or the surrounding air constituting the oxidizer supply.

The store ejection system further comprises a store ejector including a release mechanism that causes the hooks to rotate, and may include a piston to assist in pushing the store away from the aircraft. When there is no piston present, the power source provides high-pressure gas that forces the combustion chamber to move. That impact forces the linkage system to travel and rotate both hooks. Once the hooks are released, the store falls away from the aircraft. There is a sufficient gap at the end of the gas chamber to allow the expanding gas to dissipate in the air, relieving the pressure within the chamber.

If there is a piston present, not only does the high-pressure gas force the linkage system to rotate both hooks, but it also forces the piston to expand along the cylinder in which it resides. The piston helps to push the store away from the aircraft after the hooks are released. When the piston is fully expanded, gas release holes are exposed, allowing gas to escape to the atmosphere. The power source may be used to power several ejection systems at any one time. The fuel line ideally feeds several ejection systems. A regulator valve on each system prevents the fuel from igniting within the line or from accidentally igniting the other ejector systems.

The power source may extend to a second ejection system for a second store. Where there is a second store ejector for a second store, the power source powers the store ejector for the second store. In that case, the combustion-gas line extends from the power source to the second store ejector for the second store. There is desirably a selector valve selectably controllable to connect the power source separately to the store ejector for the first store and to the second store ejector for the second store.

The store-ejector power source of the present approach is based upon a controllable combustion of the fuel and the oxidizer in a combustion chamber that generates a pressurized gas to power the ejector. The fuel and oxidizer are safe and reliable to use. The gaseous combustion product is non-toxic and non-corrosive. The non-corrosive nature of the combustion product simplifies the design of the power source and the ejector. Key benefit are that the power source may be used for multiple stores, and may be rapidly recycled to permit rapid sequential ejection of the multiple stores.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
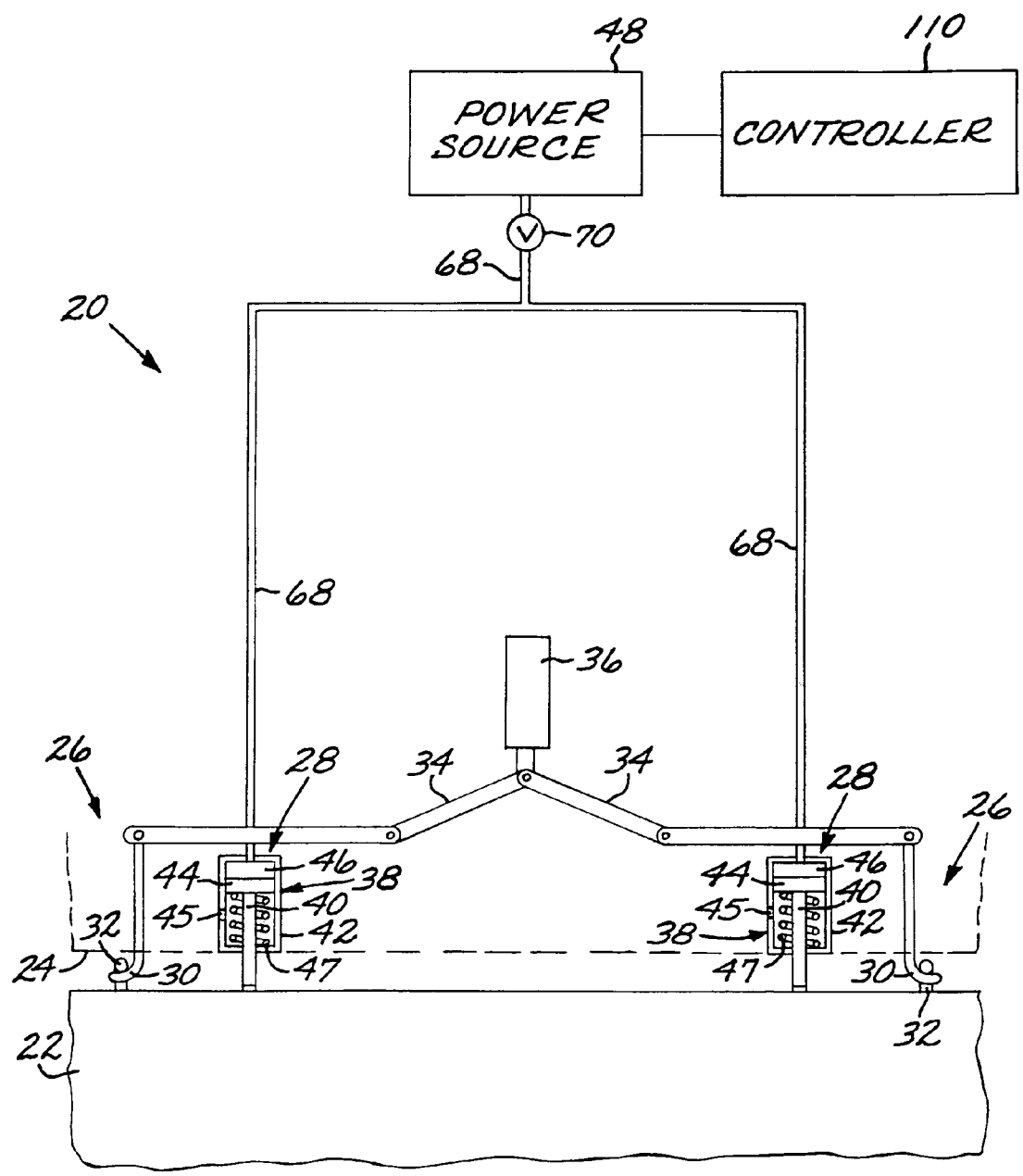
FIG. 1 is a schematic view of a store ejection system.

FIG. 1 depicts the relevant functional elements of a store ejection system 20. A store 22, such as a bomb, a fuel tank, or a reconnaissance pod, is supported below an aircraft 24, as from its fuselage or a wing-mounted bomb rack. The store ejection system 20 includes two main subsystems. The store 22 is supported on a store release mechanism 26, and after release is forced away from the aircraft 24 by a store-ejector subsystem 28.

The store release mechanism 26 includes a pair of suspension hooks 30 extending downwardly from the aircraft 24 and engaging a respective pair of lugs 32 extending upwardly from the store 22 to retain the store 22 supported from the aircraft 24. A mechanical linkage 34 within the aircraft 24 extends to each of the suspension hooks 30 and either holds them in position to engage the respective lugs 32 (the illustrated position), or, upon activation of the linkage 34 by a release activator 36, pivots the hooks 30 so that they no longer engage the lugs 32 so that the store 22 is released so that it may fall away from the aircraft 24.

Upon release of the store 22 from the aircraft 24, the store 22 is pushed away from the aircraft by the store-ejector subsystem 28. The store-ejector subsystem 28 includes at least one, and usually two, store ejectors 38. Each store ejector 38 is mounted to the aircraft 24 and has a movable push rod 40 extending from a body 42 of the store ejector 38 and contacting the store 22. The push rod 40 is initially in a retracted position (the illustrated position). Upon activation, the push rod 40 rapidly extends from the body 42 to force the store 22 away from the aircraft 24. In the preferred approach, the push rod 40 is affixed to one side of a piston 44 that slides in the body 42 of the store ejector 38. The body 42 thereby serves as a cylinder housing, and the piston 44 slides in the cylinder housing. The other side of the piston 44 faces a gas volume 46 that is controllably pressurized with a gas by a power source 48 to power the store ejector 38. The pressurized gas forces the piston 44 outwardly (downwardly in FIG. 1), so that the push rod 40 moves outwardly (downwardly in FIG. 1). When the pressurized gas has forced the piston 44 to move a sufficient distance, a pressure-release port 45 is uncovered, so that the gas pressure on the pressure side of the piston 44 is released, and the piston 44 is returned to its retracted position by a return spring 47. The store ejector 38 is thereby rapidly recycled and made ready for a subsequent ejection operation.

Figure 2:
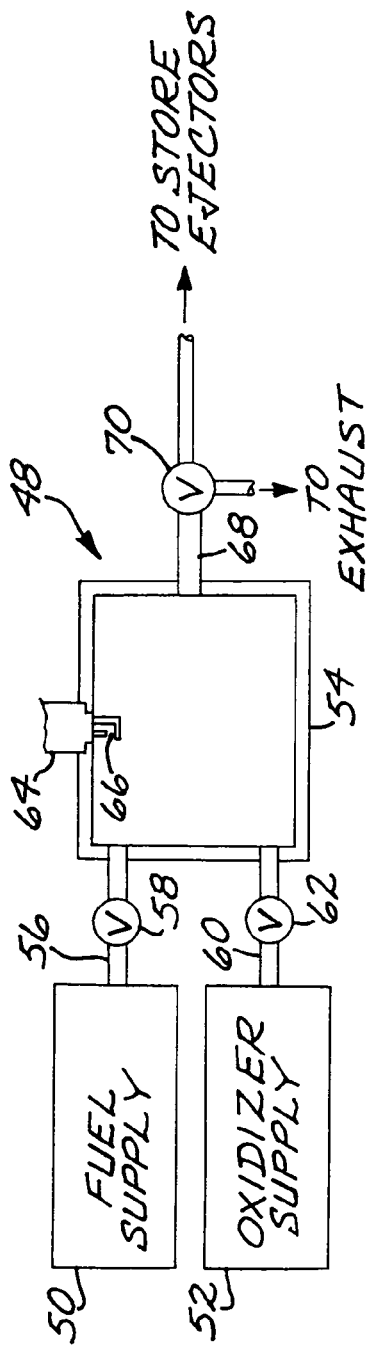
FIG. 2 is a schematic view of a power source and a store ejector according to the present approach.

FIG. 2 illustrates the power source 48 in greater detail. The power source 48 includes a fuel supply 50 of a flowable combustible fuel. The fuel is preferably a hydrocarbon, with examples being kerosene and aviation jet fuels such as JP-4 and JP-5. The power source 48 also includes an oxidizer supply 52 of a flowable oxidizer. The oxidizer is preferably a gas, such as air or oxygen. The fuel and the oxidizer are preferably selected so that their combustion product is carbon dioxide and water only, and not any corrosive, toxic, polluting, or otherwise undesirable species. The fuel and the oxidizer are preferably compressed within their respective fuel supply 50 and oxidizer supply 52. They could instead be pumped from a lower-pressure reservoir and compressed, but this approach is not preferred as its adds the weight of the pumps. Where the oxidizer is air, it may be drawn from the surrounding atmosphere, and no oxidizer supply 52 is needed.

A combustion chamber 54 controllably receives the combustible fuel from the fuel supply 50 through a fuel-supply line 56 having a fuel valve 58 therein. The combustion chamber 54 controllably receives the oxidizer from the oxidizer supply 52 (or directly from the atmosphere in the case of air being used as the oxidizer) through an oxidizer-supply line 60 having an oxidizer valve 62 therein. In the combustion chamber 54, the fuel and the oxidizer mix and form a combustible mixture thereof.

An igniter 64 controllably ignites the combustible mixture in the combustion chamber 54. The igniter 64 is essentially a spark plug having a spark gap 66 within the combustion chamber 54. A combustion-gas line 68 having a valve 70 therein extends from the combustion chamber 54 of the power source 48 to the store ejector(s) 38, and specifically to the gas volume 46 of the store ejector(s) 38. The valve 70, or some other valve, may also provide a controllable setting to exhaust and depressurize the combustion chamber 54 and communicating lines and hardware, instead of or in addition to the pressure-release port 45, if desired.

The power source 48 operates as follows. Fuel and oxidizer are admitted into the combustion chamber 54 and are mixed together to form a combustible mixture. The igniter 64 is operated to ignite the combustible mixture upon command. The combustion gases expand through the combustion-gas line 68 and cause the piston 44 to move, thereby causing the push rod 40 to extend and push the store 22 away from the aircraft 24. The pressure is released through the pressure-release port 45 and/or the exhaust setting of the valve 70, and the piston 44 and push rod 40 are retracted and readied for the next ejection operation.

Figure 3:
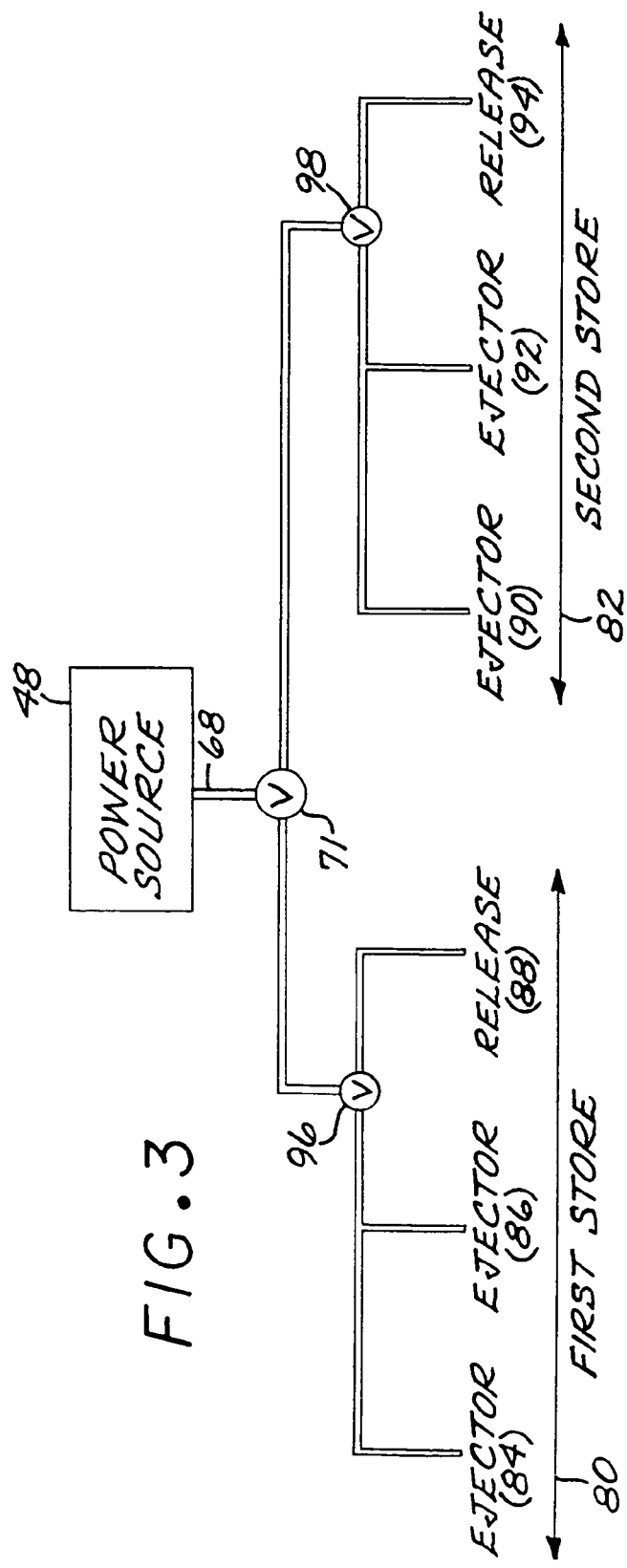
FIG. 3 is a system block diagram of a power source used to power multiple ejectors for a single store, and to power multiple ejectors for multiple stores.

The store ejection system 20 may be arranged as in FIG. 1, where the power source 48 powers only the store-ejector subsystem 28, and the store release mechanism 26 is powered completely separately. The power source 48 may be used to power other elements as well, as illustrated in FIG. 3. Specifically, the power source 48 may be used to power other ejectors and the release activator (element 36 in FIG. 1).

In the architecture of FIG. 3, there is a first store 80 and a second store 82. The first store 80 has two first-store ejectors 84, 86 and a first-store release activator 88, and the second store 82 has two second-store ejectors 90, 92 and a second-store release activator 94. A valve 71 selects between the first store 80 and the second store 82. A first-store selector valve 96 selects between whether the power source 48 is to supply combustion gas to the ejectors 84, 86 or the release activator 88 (in an embodiment where the power source 48 does power the release activator). A second-store selector valve 98 selects between whether the power source 48 is to supply combustion gas to the ejectors 90, 92 or the release 94 (in an embodiment where the power source 48 does power the release activators). (Where the power source 48 does not power the release activators, the valves 96 and 98 are not present, and the combustion-gas line runs directly to the store ejectors as in FIG. 1).

A controller 110 (FIG. 1) controls and sequences the operation of all of the controllable elements of the store ejection system 20. (The control lines are not shown in FIGS. 1-3 to avoid clutter, but such lines are present.) The controller 110 controls the power source 48 and all of the valves 58, 62, 70, 71 (where present), 96 (where present), and 98 (where present). The controller controls the release activator 36 as well, if it is powered separately from the ejectors. In normal operation, the valve 71 is operated, to select between the stores 80, 82. The respective valve 96, 98 is operated to select the respective release activator 36 for operation next, thereby rotating the suspension hooks 30 to release the store from the aircraft 24. The respective valve 96, 98 is operated next, to operate the push rod 40 to push the store away from the aircraft 24.

The present highly efficient approach is possible because the power source 48 may be operated rapidly and in a highly controllable manner. Combustion-gas pressure pulses are supplied as rapidly as the pressure from the prior pulse is depressurized, a fresh charge of fuel and oxidizer are introduced into the combustion chamber 54, and the appropriate valves or other elements are reset. This sequencing may be performed very rapidly, much in the same manner that fuel and air are introduced into the pistons of an internal combustion engine.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A store ejection system, comprising:
   a store ejector; and
   a power source that powers the store ejector, wherein the power source comprises
      a fuel supply of a flowable combustible fuel,
      a fuel supply line connected to the fuel supply,
      an oxidizer supply of a flowable oxidizer,
      an oxidizer supply line connected to the oxidizer supply,
      a combustion chamber, connected to the fuel supply line and the oxidizer supply line, that controllably receives the combustible fuel from the fuel supply and the oxidizer from the oxidizer supply and forms a combustible mixture thereof,
      an igniter that controllably ignites the combustible mixture in the combustion chamber, and
      a combustion-gas line extending from the power source to the store ejector.

2. The store ejection system of claim 1, further including a store release mechanism, wherein the power source powers the store release mechanism and the combustion-gas line extends from the power source to the store release mechanism.

3. The store ejection system of claim 1, wherein the fuel supply contains a hydrocarbon fuel.

4. The store ejection system of claim 1, wherein the fuel supply contains the combustible fuel selected from the group consisting of kerosene and an aviation jet fuel.

5. The store ejection system of claim 1, wherein the oxidizer supply contains a gaseous oxidizer.

6. The store ejection system of claim 1, wherein the oxidizer supply contains the oxidizer selected from the group consisting of air and oxygen.

7. The store ejection system of claim 1, wherein a combustion products of the combustion of the fuel and the oxidizer include carbon dioxide and water vapor.

8. The store ejection system of claim 1, further including a second store ejector, wherein the power source powers the second store ejector and the combustion-gas line extends from the power source to the second store ejector.

9. A store ejection system, comprising:
   a store ejector for a first store; and
   a power source that powers the store ejector, wherein the power source comprises
      a fuel supply of a combustible flowable fuel,
      an oxidizer supply of an oxidizer,
      a combustion chamber,
      a fuel-supply line extending from the fuel supply to the combustion chamber,
      an oxidizer-supply line extending from the oxidizer supply to the combustion chamber,
      an igniter that controllably ignites the combustible mixture in the combustion chamber, and
      a combustion-gas line extending from the power source to the store ejector.

10. The store ejection system of claim 9, further including a store release mechanism, wherein the power source powers the store release mechanism and the combustion-gas line extends from the power source to the store release mechanism.

11. The store ejection system of claim 9, wherein the fuel supply contains the combustible fuel selected from the group consisting of kerosene and aviation fuel.

12. The store ejection system of claim 9, wherein a combustion products of the combustion of the fuel and the oxidizer include carbon dioxide and water vapor.

13. The store ejection system of claim 9, further including a second store ejector for the first store, and wherein the power source powers the store release mechanism and the combustion-gas line extends from the power source to the second store ejector for the first store.

14. The store ejection system of claim 9, further including a store ejector for a second store, and wherein the power source powers the store ejector for the second store and the combustion-gas line extends from the power source to the first store ejector for the second store.

15. The store ejection system of claim 14, further including a selector valve selectably controllable to connect the power source separately to the store ejector for the first store and to the store ejector for the second store.

16. The store ejection system of claim 9, further including a second store ejector for the second store, and wherein the power source powers the second store ejector for the second store and the combustion-gas line extends from the power source to the second store ejector for the second store.

* * * * *

UNITED STATES PATENT AND TRADEMARK OFFICE
CERTIFICATE OF CORRECTION

| | | |
|---|---|---|
| PATENT NO. | : 7,506,569 B1 | Page 1 of 1 |
| APPLICATION NO. | : 10/846044 | |
| DATED | : March 24, 2009 | |
| INVENTOR(S) | : Burnett et al. | |

It is certified that error appears in the above-identified patent and that said Letters Patent is hereby corrected as shown below:

In the Specifications

Col. 3, line 33, delete "benefit" and replace with -- benefits --.

In the Claims

Col. 6, line 5, claim 1, delete "comprises" and replace with -- comprises: --.

Col. 6, line 34-35, claim 7, delete "wherein a combustion products" and replace with -- wherein combustion products --.

Col. 6, line 44, claim 9, delete "comprises" and replace with -- comprises: --.

Col. 6, line 65-66, claim 12, delete "wherein a combustion products" and replace with -- wherein combustion products --.

Signed and Sealed this
Twenty-fifth Day of March, 2014

Michelle K. Lee
*Deputy Director of the United States Patent and Trademark Office*